United States Patent
Eguchi et al.

(10) Patent No.: US 11,440,493 B2
(45) Date of Patent: Sep. 13, 2022

(54) REAR PORTION STRUCTURE OF VEHICLE

(71) Applicant: TOYOTA JIDOSHA KABUSHIKI KAISHA, Aichi-ken (JP)

(72) Inventors: Toshiaki Eguchi, Toyota (JP); Yuya Saruwatari, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 286 days.

(21) Appl. No.: 15/930,440

(22) Filed: May 13, 2020

(65) Prior Publication Data

US 2020/0369229 A1 Nov. 26, 2020

(30) Foreign Application Priority Data

May 22, 2019 (JP) .............................. JP2019-095936

(51) Int. Cl.
| | | |
|---|---|---|
| B60R 19/02 | (2006.01) | |
| B60R 19/03 | (2006.01) | |
| G01S 17/931 | (2020.01) | |
| G01S 17/08 | (2006.01) | |
| B60R 19/48 | (2006.01) | |
| B62D 35/02 | (2006.01) | |

(52) U.S. Cl.
CPC ............ *B60R 19/023* (2013.01); *B60R 19/03* (2013.01); *B60R 19/48* (2013.01); *G01S 17/08* (2013.01); *G01S 17/931* (2020.01); *B62D 35/02* (2013.01)

(58) Field of Classification Search
CPC ....... B60R 19/023; B60R 19/03; B60R 19/48; B60R 19/483; G01S 17/08; G01S 17/931; B62D 35/02

USPC ....................................... 296/193.08; 293/117
See application file for complete search history.

(56) References Cited

U.S. PATENT DOCUMENTS

| | | | | |
|---|---|---|---|---|
| 4,268,552 A | * | 5/1981 | Duvdevani | B62D 29/04 524/451 |
| 6,435,298 B1 | * | 8/2002 | Mizuno | B62D 35/02 296/180.1 |
| 2008/0036222 A1 | | 2/2008 | Iwamoto et al. | |
| 2009/0102220 A1 | * | 4/2009 | Oshio | B60K 15/063 296/39.1 |
| 2013/0026797 A1 | | 1/2013 | Onodera et al. | |
| 2018/0215424 A1 | * | 8/2018 | Marmo | B62D 29/007 |
| 2018/0361963 A1 | * | 12/2018 | Tanaka | B60R 19/48 |

FOREIGN PATENT DOCUMENTS

| | | |
|---|---|---|
| CN | 101121381 A | 2/2008 |
| CN | 109383458 A | 2/2019 |
| JP | S6154956 U | 4/1986 |

(Continued)

*Primary Examiner* — Joseph D. Pape
*Assistant Examiner* — Veronica M Shull
(74) *Attorney, Agent, or Firm* — Hauptman Ham, LLP (57) ABSTRACT

To provide a vehicle rear portion structure including a rear bumper cover disposed at the back of a vehicle, and a rear undercover. The rear undercover covers the lower surface of the body. The rear end portion of the rear undercover is connected to the lower end portion of the rear bumper cover. The rear undercover has a through hole formed on its rear portion. The rear bumper cover includes a protrusion protruding further downward of the vehicle than does the rear undercover, and an inclined portion connecting the rear edge portion of the through hole of the rear undercover and the protrusion.

10 Claims, 6 Drawing Sheets

(56) References Cited

FOREIGN PATENT DOCUMENTS

| JP | 2002326548 A | 11/2002 |
|----|--------------|---------|
| JP | 2005133529 A | 5/2005  |
| JP | 200837396 A  | 2/2008  |
| JP | 2011219042 A | 11/2011 |

* cited by examiner

FIG. 1

A-A CROSS SECTION

REAR PORTION STRUCTURE OF VEHICLE

CROSS REFERENCE TO RELATED APPLICATION

This application claims priority to Japanese Patent Application No. 2019-095936 filed on May 22, 2019, which is incorporated herein by reference in its entirety including the specification, claims, drawings, and abstract.

TECHNICAL FIELD

The present disclosure relates to a rear portion structure of a vehicle, and more particularly, to the structure of a rear bumper cover.

BACKGROUND

A vehicle often has a rear undercover disposed below the floor of the body at the back of the vehicle in order to reduce air resistance or to protect instruments mounted below the floor. The rear undercover has a through hole for discharging the air residing in the space between the rear undercover and the floor or water having entered thereinto. The air discharged through the through hole of the rear undercover then flows along the lower surface of the rear undercover toward the back of the vehicle to be discharged from the lower surface of the rear bumper cover to the rear of the vehicle. This reduces air resistance at the back of the vehicle and prevents generation of lift force (refer to JP2011-219042A, for example).

SUMMARY

In recent years, a vehicle may include an automatic driving system or a driving assistance system. Such a vehicle additionally includes a sensor, for example, for detecting vehicles behind, and the sensor, for example, is often housed in a projection below the rear bumper. In this case, the air discharged through the through hole of the rear undercover will hit on the projection below the rear bumper cover, thereby disturbing the flow of the air. In some cases this may increase air resistance or lift force.

To address the above, the present disclosure aims to reduce air resistance at the back of a vehicle and to prevent generation of lift force to thereby enhance the stability of the vehicle in running.

According to a first aspect of the present disclosure, there is provided a rear portion structure of a vehicle, including a rear bumper cover covering the outside surface of the rear bumper at the back of the vehicle; and a rear undercover having a through hole formed on the rear portion thereof, covering the lower surface of the body of the vehicle, and connected, via the rear end portion thereof, to the lower end portion of the rear bumper cover, wherein the rear bumper cover includes a protrusion that protrudes further downward of the vehicle than does the rear undercover, and an inclined portion connecting the rear edge portion of the through hole formed on the rear undercover and the protrusion.

With this structure, it is possible to direct the air having flowed out to below the rear undercover through the through hole of the rear undercover such that the air flows smoothly along the inclined portion toward the rear of the vehicle. With the above, it is possible to reduce air resistance at the back of the vehicle and to prevent generation of lift force, to thereby enhance the stability of the vehicle in running.

In the rear portion structure of a vehicle according to the present disclosure, the inclined portion and the protrusion of the rear bumper cover may be integrally molded from resin, the rear portion structure may further include a bendable integral hinge between the inclined portion and the protrusion, and the inclined portion may be rotated upward at the integral hinge such that the front end portion thereof is fastened to the lower surface of the rear undercover.

With this structure, the inclined portion and the protrusion of the rear bumper cover are integrally molded from resin, and, in mounting the rear bumper cover, it is possible to first mount the rear bumper cover on the body, and then push up the inclined portion such that the inclined portion rotates upward at the integral hinge so that the front end portion of the inclined portion can be fastened to the lower surface of the rear undercover. This can facilitate manufacturing and mounting of the rear bumper cover.

In the rear portion structure of a vehicle according to the present disclosure, the inclined portion of the rear bumper cover may include an inclined plate connecting the rear edge portion of the through hole formed on the rear undercover and the protrusion, and a side plate extending upward from each of side end portions of the inclined plate toward the lower surface of the rear undercover.

With this structure, it is possible to reduce the amount of air flowing into the interior of the rear bumper cover from the respective sides of the inclined plate. This can reduce air resistance at the back of the vehicle and prevent generation of lift force to thereby enhance the stability of the vehicle in running.

In the rear portion structure of a vehicle according to the present disclosure, the rear bumper cover includes an upper cover on the upper side of the vehicle, and a lower cover on the lower side of the vehicle, the lower cover having the protrusion and the inclined portion, the lower cover being connected, via its upper end portion, to the upper cover, and connected, via its lower end portion thereof, to a rear end portion of the rear undercover, the inclined portion and the protrusion of the lower cover are integrally molded from resin, the rear portion structure further includes a bendable integral hinge between the inclined portion and the protrusion, the inclined portion is rotated upward at the integral hinge such that the front end portion thereof is fastened to the lower surface of the rear undercover, and the inclined portion of the lower cover includes an inclined plate connecting the rear edge portion of the through hole formed on the rear undercover and the protrusion, and a side plate extending upward from each of the side end portions of the inclined plate toward the lower surface of the rear undercover.

As described above, the two-part structure of the rear bumper cover, including the upper and lower portions, further facilitates mounting of the rear bumper cover.

The rear portion structure of a vehicle according to the present disclosure may further include a distance measuring sensor held inside the protrusion.

This enables reduction in air resistance at the back of the vehicle, and allows provision of a sensor for automatic driving.

According to the present disclosure, it is possible to reduce air resistance at the back of a vehicle and also to prevent generation of lift force, to thereby enhance the stability of the vehicle in running.

BRIEF DESCRIPTION OF DRAWINGS

Embodiment(s) of the present disclosure will be described based on the following figures, wherein.

DESCRIPTION OF EMBODIMENTS

In the following, a rear portion structure of a vehicle, or a vehicle rear portion structure 100, in an embodiment will be described with reference to the drawings. Note that the arrows FR, UP, and RH in the respective drawings indicate the forward (advancing), upper, and rightward directions, respectively, of the vehicle. Also, the opposite directions of these arrows FR, UP, RH indicate the rearward, downward, and leftward directions, respectively, of the vehicle. In the following, simple reference to the front or back, right or left, or up or down direction in the description is assumed to indicate that in the front-back direction, the right-left direction (or the vehicle width direction), or the up-down direction of a vehicle, respectively, unless otherwise stated.

Figure 1:
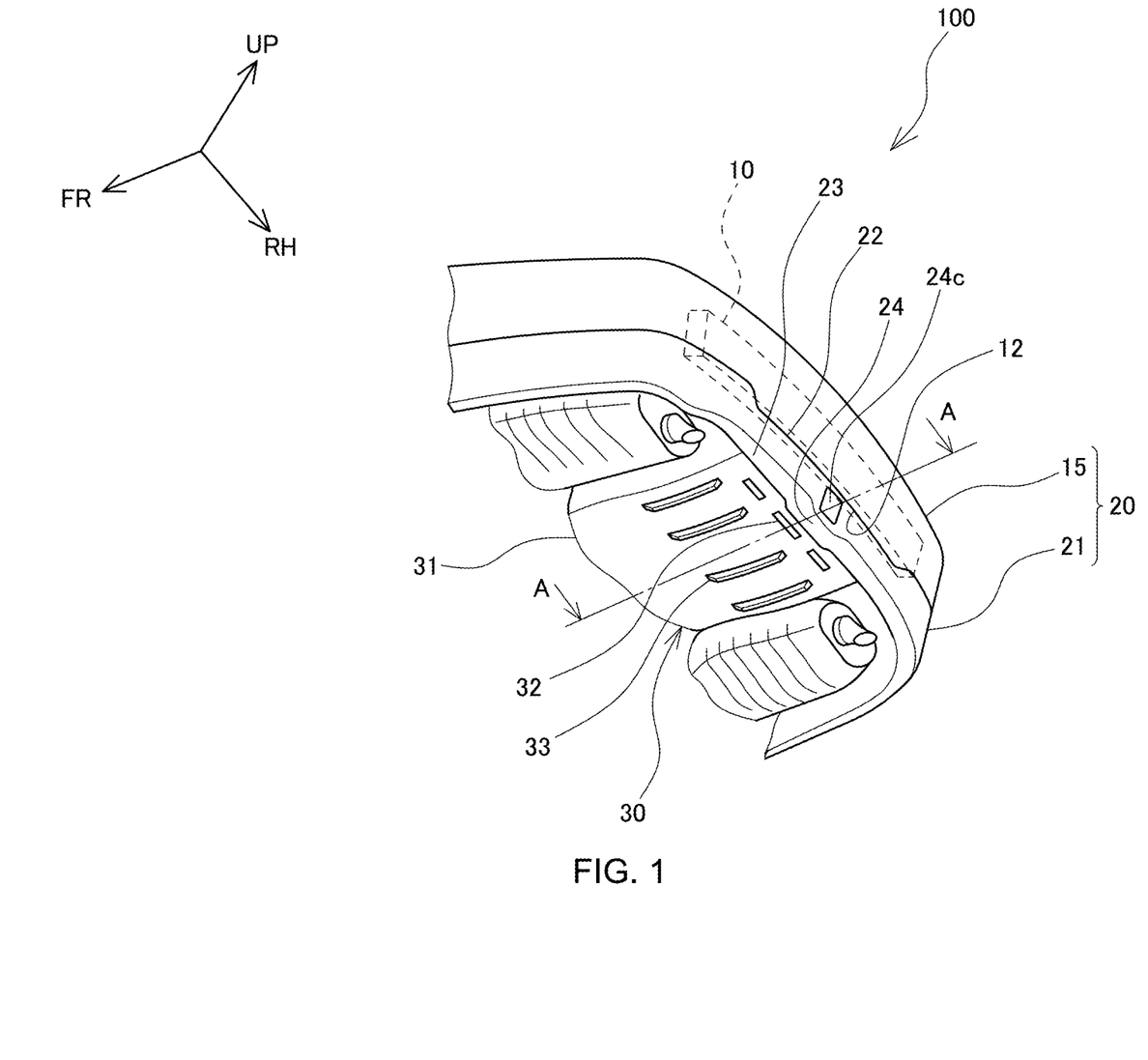
FIG. 1 is a perspective view of the rear portion structure of a vehicle according to an embodiment, viewed from below the vehicle.

As illustrated in FIG. 1, the vehicle rear portion structure 100 in this embodiment includes a rear bumper cover 20 and a rear undercover 30. The rear bumper cover 20 covers the outside surface of a rear bumper 10 at the back of the vehicle. The rear undercover 30 covers the lower surface of the rear portion of the body.

Figure 2:
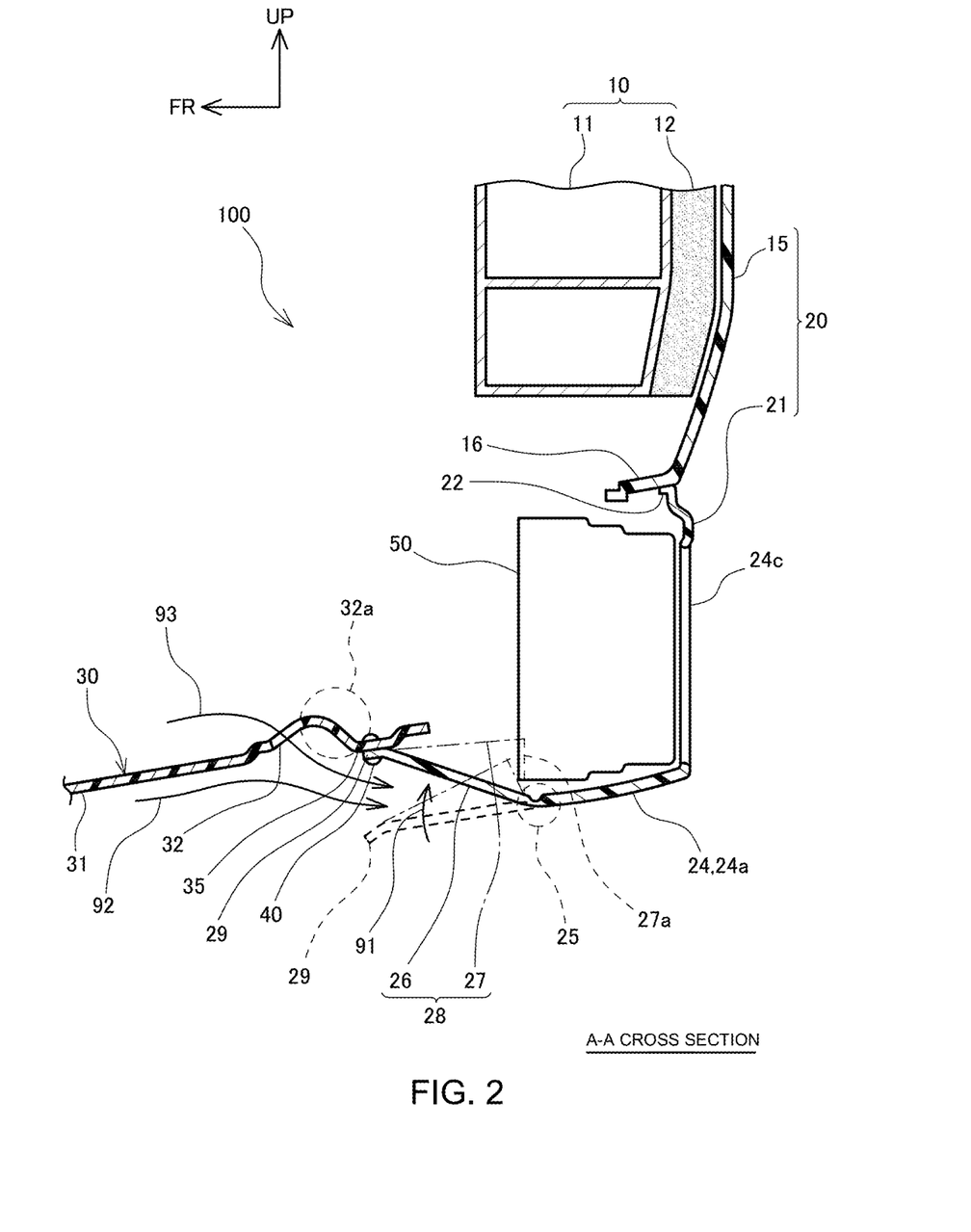
FIG. 2 is a cross sectional view along line A-A in FIG. 1.

As illustrated in FIG. 2, the rear bumper 10 includes a bumper reinforcement 11 and a cushion member 12. The bumper reinforcement 11 is a skeleton member extending in the vehicle width direction at the back of the body. The cushion member 12 is disposed behind the bumper reinforcement 11.

Figure 3:
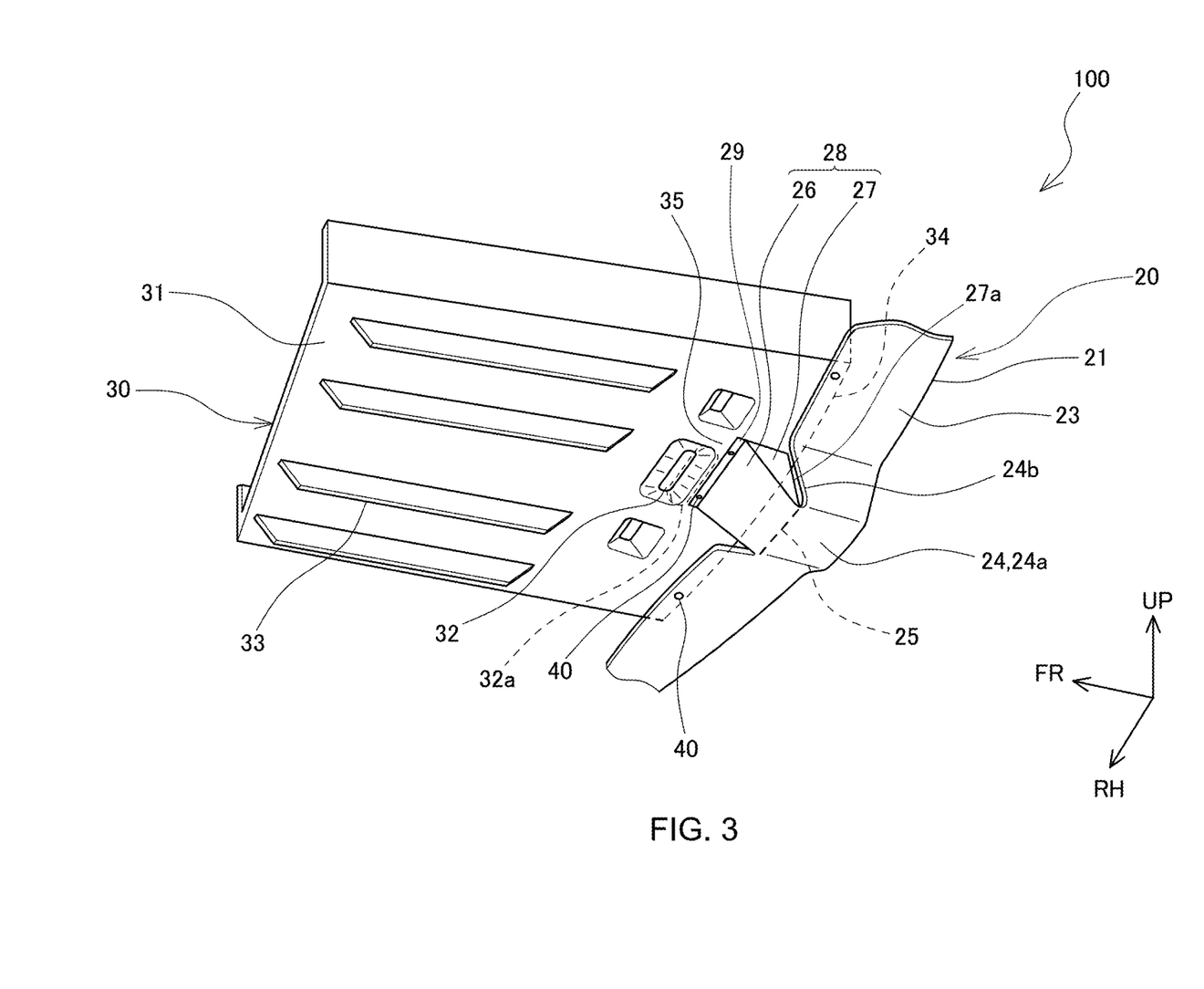
FIG. 3 is an enlarged perspective view of the rear bumper cover and the rear undercover of the rear portion structure of a vehicle according to an embodiment, viewed from diagonally below the vehicle.

The rear bumper cover 20 includes an upper cover 15 on the upper side of the vehicle and a lower cover 21 on the lower side, the upper cover 15 covering the outside of the cushion member 12 of the rear bumper 10. The upper cover 15 and the lower cover 21 are integrally molded from resin. The upper cover 15 is mounted on the bumper reinforcement 11. The lower cover 21 is mounted such that its upper end portion 22 is connected to a lower end portion 16 of the upper cover 15, and, as illustrated in FIG. 3, its lower end portions 23 on the respective sides in the vehicle width direction are connected to a rear end portion 34 of the rear undercover 30. In addition, a protrusion 24, to be described later, an inclined portion 28, and an integral hinge 25 are formed on the lower side of the lower cover 21 at the middle in the vehicle width direction.

As illustrated in FIG. 3, the rear undercover 30 is a resin molded member including a lower plate 31, a plurality of ribs 33, and a through hole 32. The ribs 33 are disposed on a lower surface 35 of the lower plate 31 so as to extend in the front-back direction. The through hole 32 is formed on the rear portion of the rear undercover 30. The rear undercover 30 is mounted on the lower side of the body. The rear end portion 34 is fastened to the lower end portions 23 of the lower cover 21 with clips 40.

On the lower side of the lower cover 21 at the middle in the vehicle width direction, the protrusion 24, the inclined portion 28, and the integral hinge 25 are formed. The protrusion 24, the inclined portion 28, and the integral hinge 25 are molded from resin so as to be integral with the other portions of the lower cover 21.

The protrusion 24 is a portion located at the middle in the vehicle width direction and protruding downward from the lower end portions 23 on the respective sides in the vehicle width direction. A lower surface 24a of the protrusion 24 protrudes is positioned more downward than the lower surface 35 of the rear undercover 30. The inclined portion 28 is a portion extending forward of the vehicle from the protrusion 24. The inclined portion 28 includes an inclined plate 26 and triangular side plates 27. The inclined plate 26 connects a rear edge portion 32a of the through hole 32 formed on the rear undercover 30 and the lower surface 24a of the protrusion 24. The side plates 27 extend upward from the respective side end portions of the inclined plate 26 toward the lower surface 35 of the rear undercover 30. A front end portion 29 of the inclined portion 28 is fastened to the lower surface 35 of the lower plate 31 of the rear undercover 30 with clips 40.

As illustrated in FIG. 2, the integral hinge 25 is formed between the inclined plate 26 and the protrusion 24. The integral hinge 25 corresponds to a groove-like portion having a thinner thickness and extending in the vehicle width direction. The inclined plate 26 can rotate as indicated by arrow 91 in FIG. 2, with the integral hinge 25 as the rotation axis.

As illustrated in FIG. 2, a distance measuring sensor 50 for measuring the distance to a following vehicle, for example, in automatic driving is accommodated inside the protrusion 24. The distance measuring sensor 50 can be of any type, and, for example, a LiDAR using a laser is usable. In this case, a laser beam is transmitted and received through an opening 24c defined on the rear end surface of the protrusion 24 of the lower cover 21.

In the following, steps of mounting the vehicle rear portion structure 100 having the above described structure in a vehicle body will be described.

The inclined portion 28 of the lower cover 21 before being mounted extends on substantially the same plane as the lower surface 24a of the protrusion 24, as indicted by the broken line in FIG. 2; that is, the inclined portion 28 is not inclined toward the rear undercover 30. With the inclined portion 28 in this posture, the distance measuring sensor 50 is mounted inside the protrusion 24 of the lower cover 21.

The upper cover 15 is mounted on the bumper reinforcement 11. The rear undercover 30 is mounted on the lower surface of the back of the vehicle body. Then, as illustrated in FIG. 2, the upper end portion 22 of the lower cover 21 is placed on the lower side of the upper cover 15 and fastened to the lower end portion 16 of the upper cover 15 with a fastening member, such as a clip. Further, as illustrated in FIG. 3, the front portions of the lower end portions 23 of the lower cover 21 on the respective sides in the vehicle width direction are placed on the rear end portion 34 of the lower plate 31 of the rear undercover 30 and fastened to the rear end portion 34 with clips 40. Then, as indicated by the broken line in FIG. 2, the inclined portion 28, which extends linearly forward from the protrusion 24, is pushed up, as indicated by the arrow 91 in FIG. 2. In the above, the inclined portion 28 rotates with the integral hinge 25 as a rotation axis. Consequently, the front end portion 29 abuts on the lower surface 35 of the rear undercover 30, and is fastened to the lower plate 31 with the clips 40. With the above, the inclined plate 26 connects the rear edge portion 32a of the through hole 32 and the protrusion 24 in an inclined manner. As illustrated in FIG. 3, as a result of the rotation, rear edges 27a of the side plates 27 of the inclined portion 28 are positioned close to front end faces 24b of the protrusion 24.

When a vehicle having the upper cover 15, the lower cover 21, and the rear undercover 30 all mounted on the body of the vehicle as described above runs, the air in the space between the rear undercover 30 and the body is discharged to below the rear undercover 30 through the through hole 32, as indicated by arrow 93 in FIG. 2. The discharged air below the rear undercover 30 smoothly flows diagonally downward along the surface of the inclined plate 26. In addition, as indicated by an arrow 92 in FIG. 2, the air having flowed along the lower surface 35 of the rear undercover 30 smoothly flows diagonally downward along the surface of the inclined plate 26, together with the air discharged through the through hole 32. With the above, the air resistance at the back of the vehicle can be reduced, and generation of lift force can be prevented to thereby enhance the stability of the vehicle in running. Further, since the rear edges 27a of the side plates 27 of the inclined portion 28 are positioned close to the front end faces 24b of the protrusion 24, entry of air from the lateral sides of the inclined portion 28 into the interior of the lower cover 21 can be prevented. This can reduce air resistance at the back of the vehicle, and prevent generation of lift force, to thereby enhance the stability of the vehicle in running.

In the vehicle rear portion structure 100 in this embodiment, the protrusion 24, the inclined portion 28, and the integral hinge 25 of the lower cover 21, the integral hinge 25 being between the protrusion 24 and the inclined portion 28, are integrally molded from resin, so that the inclined portion 28 is rotated with the integral hinge 25 as the rotation center in mounting the lower cover 21 to fasten the front end portion 29 to the lower surface 35 of the rear undercover 30, and the rear bumper cover 20 has a two-part structure including an upper portion and a lower portion; namely, the upper cover 15 and the lower cover 21. These points can facilitate manufacturing and mounting of the lower cover 21.

In addition, as the distance measuring sensor 50 is housed in the interior of the protrusion 24 of the lower cover 21, it is possible to reduce air resistance at the back of the vehicle, and to provide the distance measuring sensor 50 for automatic driving.

Although it is described that the rear bumper cover 20 of the vehicle rear portion structure 100 in the above-described embodiment has a two-part structure including an upper portion and a lower portion; namely, the upper cover 15 and the lower cover 21, this is not an exclusive structure, and the rear bumper cover 20 may be integrally molded from resin. In addition, the rear edge 27a of the side plate 27 of the inclined portion 28 may be disposed in contact with the front end faces 24b of the protrusion 24. In this case as well, it is possible to reduce air resistance at the back of the vehicle and to prevent generation of lift force to thereby enhance the stability of the vehicle in running.

Figure 4:
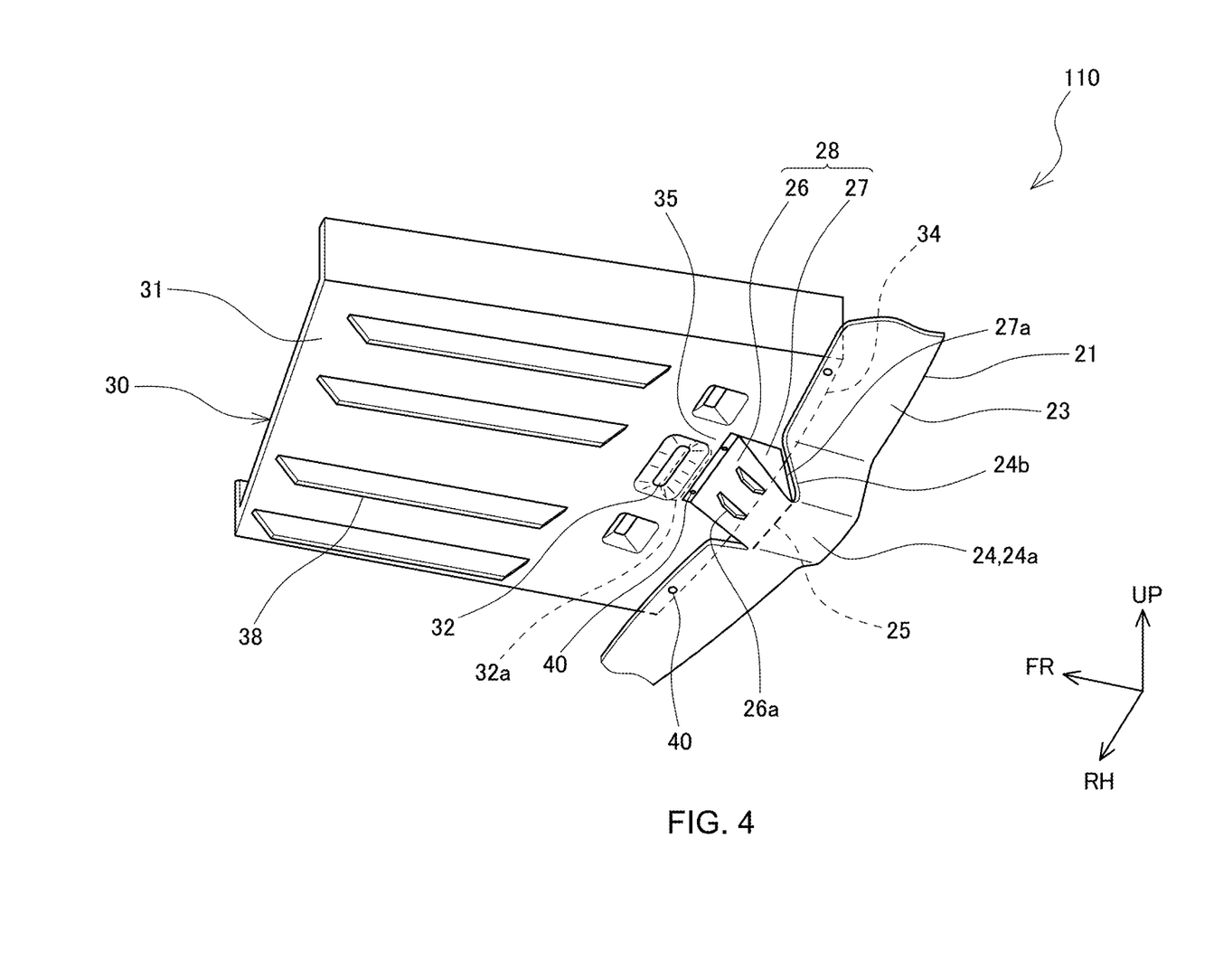
FIG. 4 is an enlarged perspective view of the rear bumper cover and the rear undercover of the rear portion structure of a vehicle according to another embodiment, viewed from below the vehicle.

Referring to FIG. 4, a vehicle rear portion structure 110 in another embodiment will be described. Note that elements similar to those in the vehicle rear portion structure 100 described above by reference to FIG. 1 to FIG. 3 are assigned the same reference numerals, and will not be described again.

As illustrated in FIG. 4, the vehicle rear portion structure 110 includes ribs 26a that are mounted on the surface of the inclined plate 26 so as to extend in the front-back direction of the vehicle. The ribs 26a enable a smoother flow of air, and further reduction in air resistance at the back of the vehicle.

Figure 5:
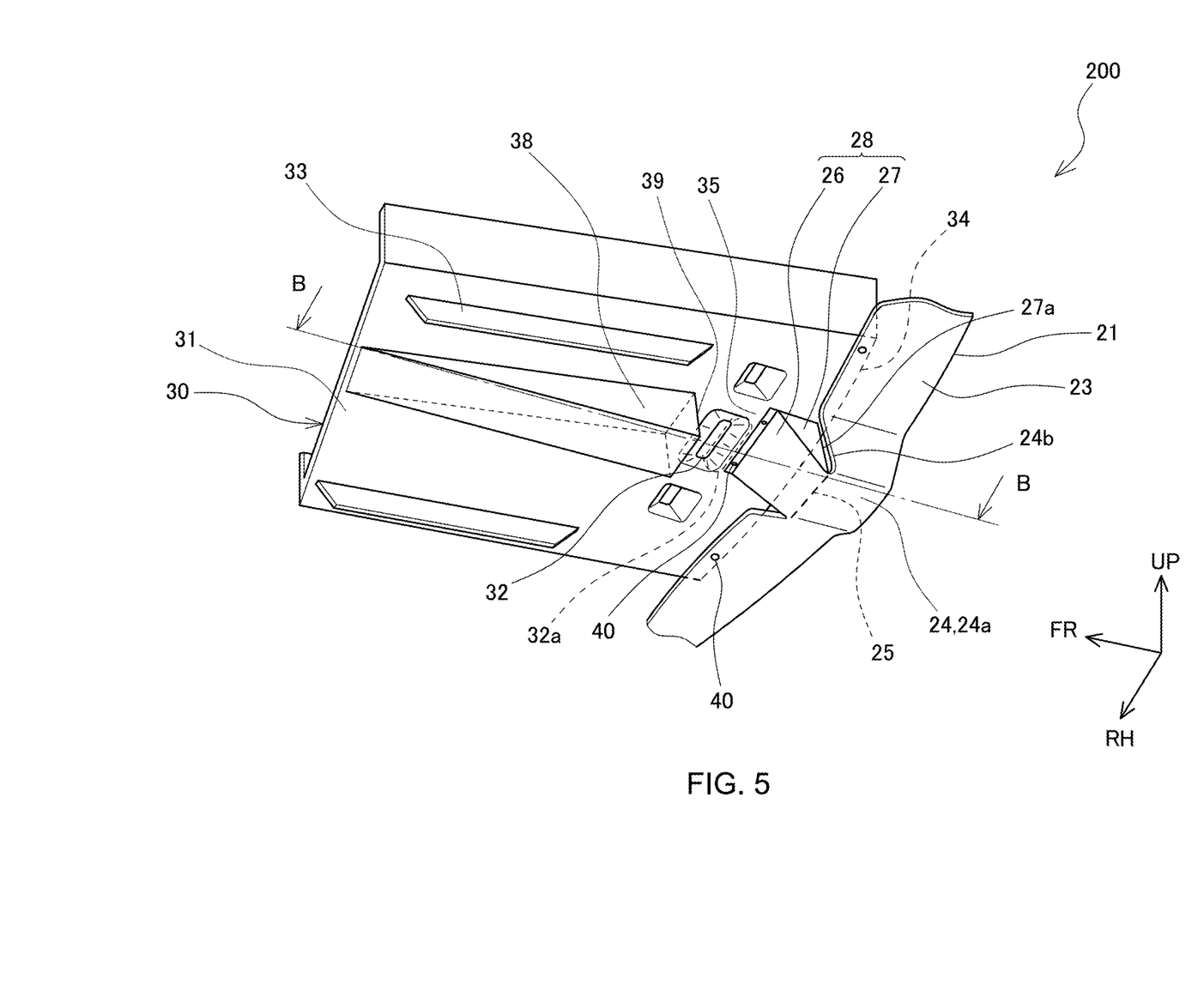
FIG. 5 is an enlarged perspective view of the rear bumper cover and the rear undercover of the rear portion structure of a vehicle according to another embodiment, viewed from below the vehicle.
Figure 6:
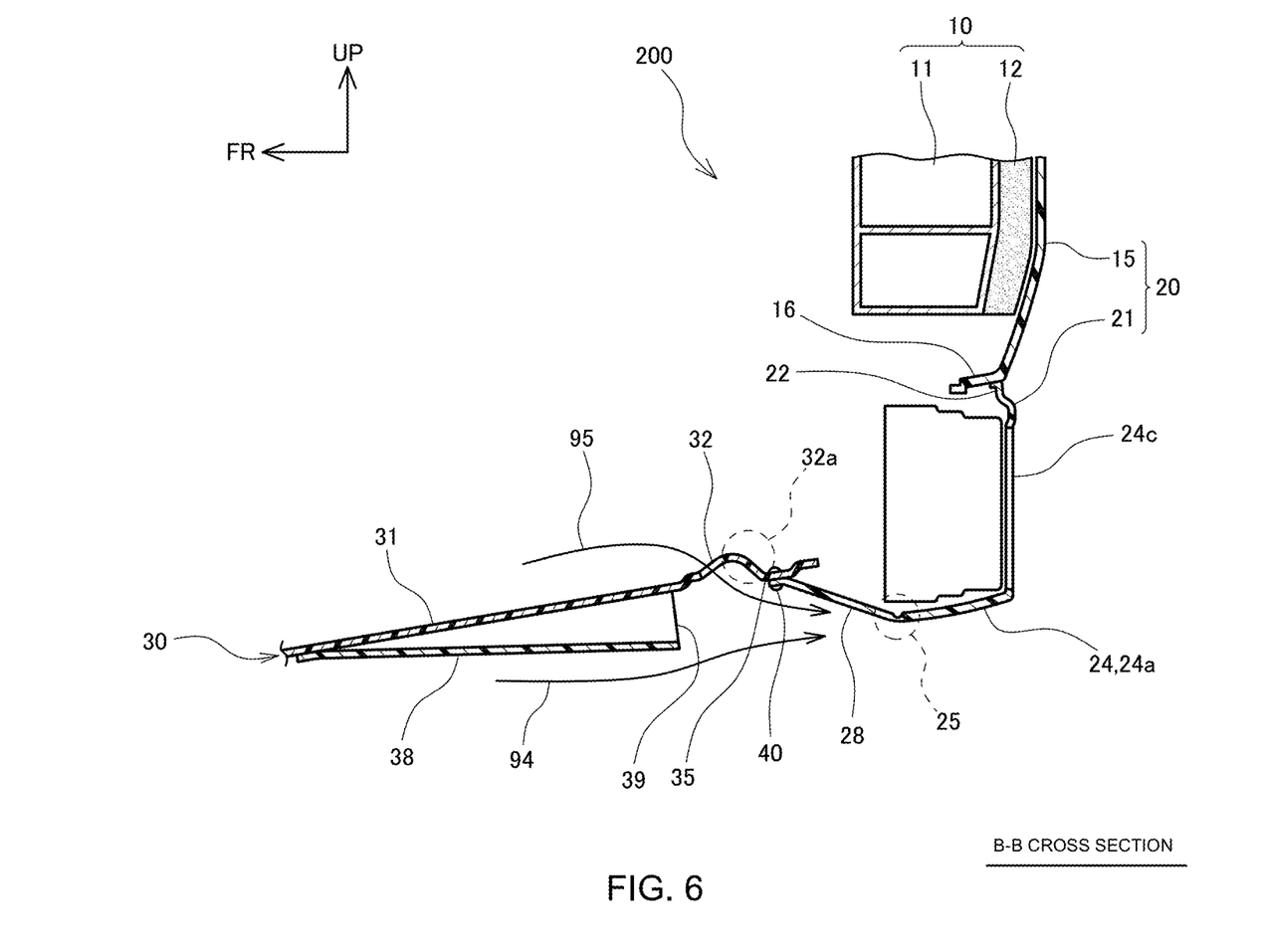
FIG. 6 is a cross sectional view along line B-B in FIG. 5.

Referring to FIG. 5 to FIG. 6, a vehicle rear portion structure 200 of still another embodiment will be described. Note that elements similar to those in the vehicle rear portion structure 100 described above by reference to FIG. 1 to FIG. 3 are assigned the same reference numerals, and will not be described again.

As illustrated in FIG. 5, the vehicle rear portion structure 200 includes a cover 38 that is mounted at the middle of the lower surface 35 of the rear undercover 30 of the vehicle rear portion structure 100 described above so as to extend in the front-back direction of the vehicle. The cover 38 has a cross section shaped like a groove that becomes deeperas it extends rearward along the vehicle. The level of the rear end portion 39 of the cover 38 is substantially the same as that of the lower surface 24a of the protrusion 24 of the lower cover 21.

As illustrated in FIG. 6, the vehicle rear portion structure 200 causes the air flowing at the middle of the rear undercover 30 in the vehicle to flow along the lower surface of the cover 38, and the air flowing along the cover 38 to flow smoothly toward the lower surface 24a of the protrusion 24. This enables a smoother flow of air, and further reduction in air resistance at the back of the vehicle.

The invention claimed is:

1. A rear portion structure of a vehicle, comprising:
   a rear bumper cover covering an outside surface of a rear bumper at a back of the vehicle; and
   a rear undercover having a through hole formed on a rear portion thereof, the rear undercover covering a lower surface of a body of the vehicle, and the rear undercover being connected, via a rear end portion thereof, to a lower end portion of the rear bumper cover,
   wherein
   the rear bumper cover includes a protrusion that protrudes further downward of the vehicle than does the rear undercover and an inclined portion connecting a rear edge portion of the through hole formed on the rear undercover and the protrusion.

2. The rear portion structure of a vehicle according to claim 1, wherein
   the inclined portion and the protrusion of the rear bumper cover are integrally molded from resin,
   the rear portion structure further comprises a bendable integral hinge between the inclined portion and the protrusion, and
   the inclined portion is rotated upward at the integral hinge such that a front end portion thereof is fastened to a lower surface of the rear undercover.

3. The rear portion structure of a vehicle according to claim 1, wherein
   the inclined portion of the rear bumper cover includes
      an inclined plate connecting a rear edge portion of the through hole formed on the rear undercover and the protrusion, and
      a side plate extending upward from each of the side end portions of the inclined plate toward a lower surface of the rear undercover.

4. The rear portion structure of a vehicle according to claim 2, wherein
   the inclined portion of the rear bumper cover includes an inclined plate connecting a rear edge portion of the through hole formed on the rear undercover and the protrusion, and a side plate extending upward from each of the side end portions of the inclined plate toward a lower surface of the rear undercover.

5. The rear portion structure of a vehicle according to claim 1, wherein the rear bumper cover includes an upper cover on an upper side of the vehicle, and a lower cover on a lower side of the vehicle, the lower cover having the protrusion and the inclined portion, the lower cover being connected, via an upper end portion thereof, to the upper cover, and the lower cover being connected, via a lower end portion thereof, to a rear end portion of the rear undercover, the inclined portion and the protrusion of the lower cover are integrally molded from resin, the rear portion structure further includes a bendable integral hinge between the inclined portion and the protrusion, the inclined portion is rotated upward at the integral hinge such that a front end portion thereof is fastened to the lower surface of the rear undercover, and the inclined portion of the lower cover includes an inclined plate connecting a rear edge portion of the through hole formed on the rear undercover and the protrusion, and a side plate extending upward from each of the side end portions of the inclined plate toward a lower surface of the rear undercover.

6. The rear portion structure of a vehicle according to claim 1, further comprising a distance measuring sensor held inside the protrusion.

7. The rear portion structure of a vehicle according to claim 2, further comprising a distance measuring sensor held inside the protrusion.

8. The rear portion structure of a vehicle according to claim 3, further comprising a distance measuring sensor held inside the protrusion.

9. The rear portion structure of a vehicle according to claim 4, further comprising a distance measuring sensor held inside the protrusion.

10. The rear portion structure of a vehicle according to claim 5, further comprising a distance measuring sensor held inside the protrusion.

* * * * *